United States Patent
Lehr et al.

(10) Patent No.: US 8,392,573 B2
(45) Date of Patent: Mar. 5, 2013

(54) TRANSPORT OF CUSTOMER FLEXIBILITY CHANGES IN A MULTI-TENANT ENVIRONMENT

(75) Inventors: Matthias Lehr, Weinheim (DE); Stefan Baeuerle, Rauenberg-Rotenberg (DE); Karsten Fanghaenel, Schwetzingen (DE); Bernhard Thimmel, Edingen-Neckarhausen (DE); Uwe Schlarb, Ostringen (DE); Olaf Meincke, Shanghai (CN); Volker Driesen, Walldorf (DE); Juergen Specht, Benningen (DE)

(73) Assignee: SAP AG, Walldorf (DE)

( * ) Notice: Subject to any disclaimer, the term of this patent is extended or adjusted under 35 U.S.C. 154(b) by 402 days.

(21) Appl. No.: 12/847,746

(22) Filed: Jul. 30, 2010

(65) Prior Publication Data
US 2012/0030312 A1 Feb. 2, 2012

(51) Int. Cl.
*G06F 15/173* (2006.01)
(52) U.S. Cl. ......... 709/226; 709/217; 709/232; 709/248
(58) Field of Classification Search .................. 709/217, 709/226, 232, 248
See application file for complete search history.

(56) References Cited

U.S. PATENT DOCUMENTS

| 7,774,504 | B2 * | 8/2010 | Chene et al. ................ 709/246 |
| 8,010,627 | B1 * | 8/2011 | Schneebeli et al. ........... 709/218 |
| 8,291,490 | B1 * | 10/2012 | Ahmed et al. .................. 726/17 |
| 2002/0049608 | A1 * | 4/2002 | Hartsell et al. ................... 705/1 |
| 2007/0162420 | A1 * | 7/2007 | Ou et al. ........................... 707/1 |
| 2011/0282969 | A1 * | 11/2011 | Iyer et al. ...................... 709/217 |
| 2011/0289140 | A1 * | 11/2011 | Pletter et al. ................... 709/203 |
| 2012/0030312 | A1 * | 2/2012 | Lehr et al. .................... 709/219 |

* cited by examiner

*Primary Examiner* — Michael Won
(74) *Attorney, Agent, or Firm* — Mintz Levin Cohn Ferris Glovsky and Popeo, P.C.

(57) ABSTRACT

Transporting of flexibility changes of customer content between tenants in a multi-tenant computing system can be performed by exporting customer content from a first tenant of the multi-tenant computing system, transporting the customer content exported from the first tenant to a second tenant of the multi-tenant computing system, importing the customer content into a staging area in the second tenant to enable a user associated with second tenant to access the customer content via the staging area based on a content extraction trigger, and activating selected customer content from the staging area in a productive component of the second tenant. The content extraction trigger can characterize an extraction of at least some of the customer content from the staging area. Related methods, systems, and articles of manufacture are also disclosed.

20 Claims, 5 Drawing Sheets

TRANSPORT OF CUSTOMER FLEXIBILITY CHANGES IN A MULTI-TENANT ENVIRONMENT

TECHNICAL FIELD

The subject matter described herein relates to transporting of customer flexibility changes, for example between tenants in a multi-tenant environment.

BACKGROUND

Various organizations make use of enterprise resource planning (ERP) software architectures to provide an integrated, computer-based system for management of internal and external resources, such as, for example, tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, etc.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Such an approach can introduce several challenges. For instance, a customer can have multiple tenants, and can designate one of its tenants as a test tenant to determine the effects of new extensions or new or different fields to business configuration data, referred to herein as "flexibility changes". These flexibility changes often need to be transported from the test tenant to one or more other productive tenants. Current ABAP transport infrastructure is not adapted to the tenant environment, and therefore flexibility changes that are implemented and tested on the test tenant are not able to be transported to other, productive tenants in the multi-tenant environment.

SUMMARY

This document presents a system and method for transport of customer flexibility changes between tenants in a multi-tenant computing environment.

In one aspect, a computer-implemented method includes identifying a content move trigger in a multi-tenant computing system. The content move trigger characterizes a transfer of customer content from a first tenant of the multi-tenant computing system to a second tenant of the multi-tenant computing system. The customer content is exported from the first tenant based on the content move trigger; and the exported content is transported from the first tenant to the second tenant where it is imported into a staging area in the second tenant to enable a user associated with the second tenant to selectively access the exported customer content via the staging area based on a content extraction trigger. The content extraction trigger characterizes an extraction of selected customer content from the staging area to activate the selected customer content in the second tenant. The multi-tenant computing system forms part of a multi-tenant environment using a single software delivery architecture, and includes at least one processor implementing an application server accessible over a network from the plurality of clients associated with each of multiple tenants, and at least one data repository containing. The at least one data repository contains core software platform content relating to the operation of the multi-tenant computing system which is not modifiable by the multiple tenants, system content including data objects created in runtime by the multi-tenant computing system that are modifiable with data provided by a corresponding tenant, and the customer content including data objects or extensions to data objects that are customized for a corresponding tenant.

In an interrelated aspect, a computer-implemented method for transporting flexibility changes of customer content between tenants in a multi-tenant computing system includes exporting customer content from a first tenant of the multi-tenant computing system, transporting the customer content exported from the first tenant to a second tenant of the multi-tenant computing system, importing the customer content into a staging area in the second tenant to enable a user associated with second tenant to access the customer content via the staging area based on a content extraction trigger, and activating selected customer content from the staging area in a productive component of the second tenant. The content extraction trigger characterizes an extraction of at least some of the customer content from the staging area.

In some variations, one or more of the following can optionally be included. The content extraction trigger can be based on a content type. The selected content can be activated in the second tenant, for example from a staging area of the second tenant. The activating of the selected content can be monitored to determine errors in the staging area. The staging area can further include a generic staging area that persists the selected customer content and a local staging area that extracts the selected customer content from the generic staging area according to a content type associated with the customer content.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

It should be noted that, while the descriptions of specific implementations of the current subject matter make reference to delivery of enterprise resource planning software to multiple organizations via a multi-tenant system, the current subject matter is applicable to other types of software and data services access as well. Furthermore, all discussions of possible user interface interactions in the following description of various implementations of the current subject matter are intended to be merely illustrative and completely non-limiting. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Like reference symbols in the various drawings indicate like elements.

DETAILED DESCRIPTION

This document describes a system and method for transporting customer content between customer tenants in a multi-tenant computing environment. In particular, the system and method described herein can be used to transport customer flexibility changes between tenants in a multi-tenant environment.

Figure 1:
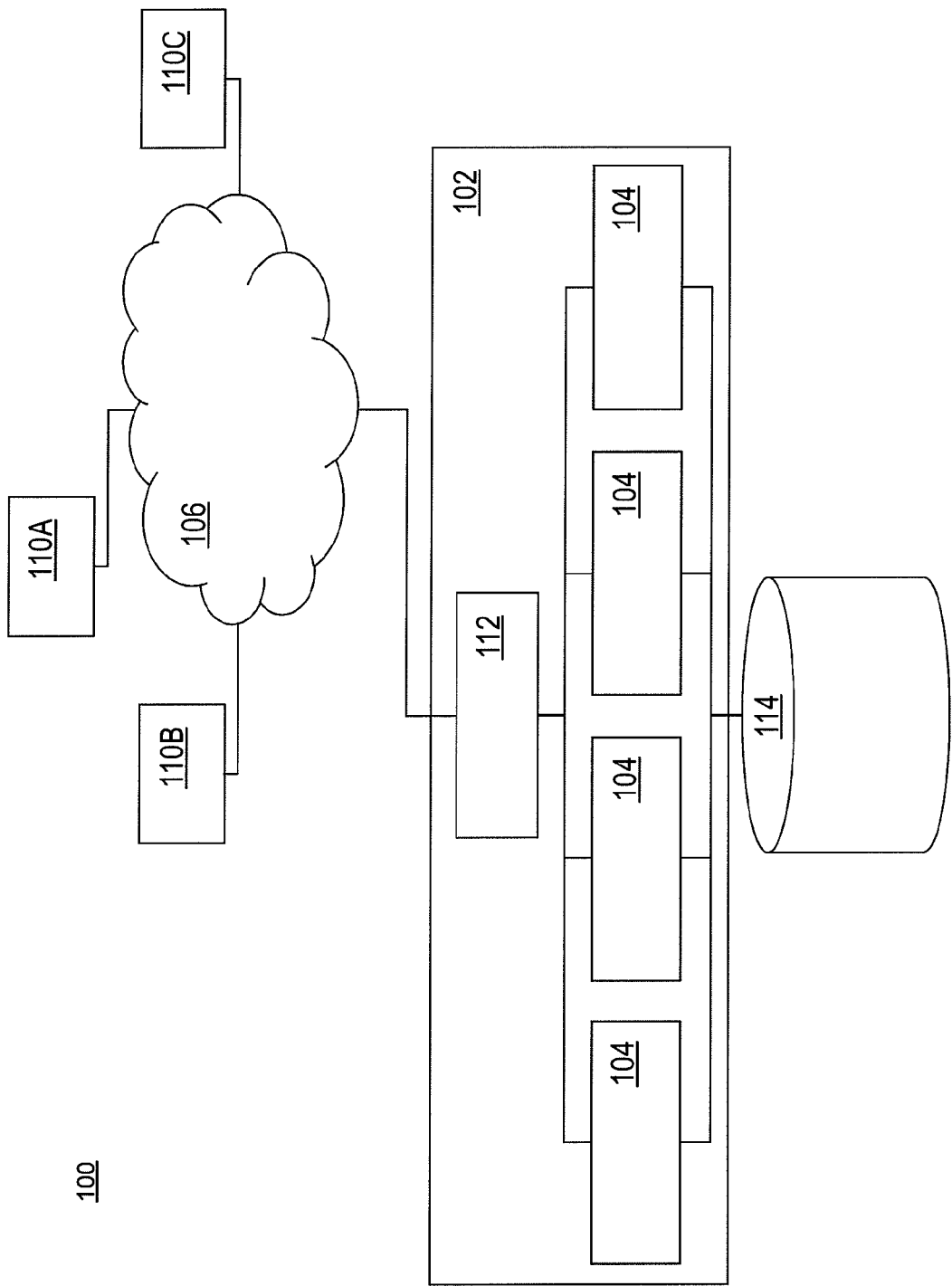
FIG. 1 is a diagram of a multi-tenant computing system.

FIG. 1 shows a block diagram of a multi-tenant environment 100 that includes an application server 102, which in some implementations can include multiple server systems 104 that are accessible over a network 106 from client machines operated by users at each of multiple organizations 110A-110C (referred to herein as "tenants" of a multi-tenant computing system or environment) supported by a single software delivery architecture. One example of such a software delivery architecture can include features similar to those of the Business ByDesign™ software available from SAP AG (Walldorf, Germany).

For a system in which the application server 102 includes multiple server systems 104, the application server can include a load balancer 112 to distribute requests and actions from users at the one or more organizations 110A-110C to the one or more server systems 104. A user can access the software delivery architecture across the network using a thin client, such as, for example, a web browser or the like, or other portal software running on a client machine. The application server 102 can access data and data objects stored in one or more data repositories 114.

Figure 2:
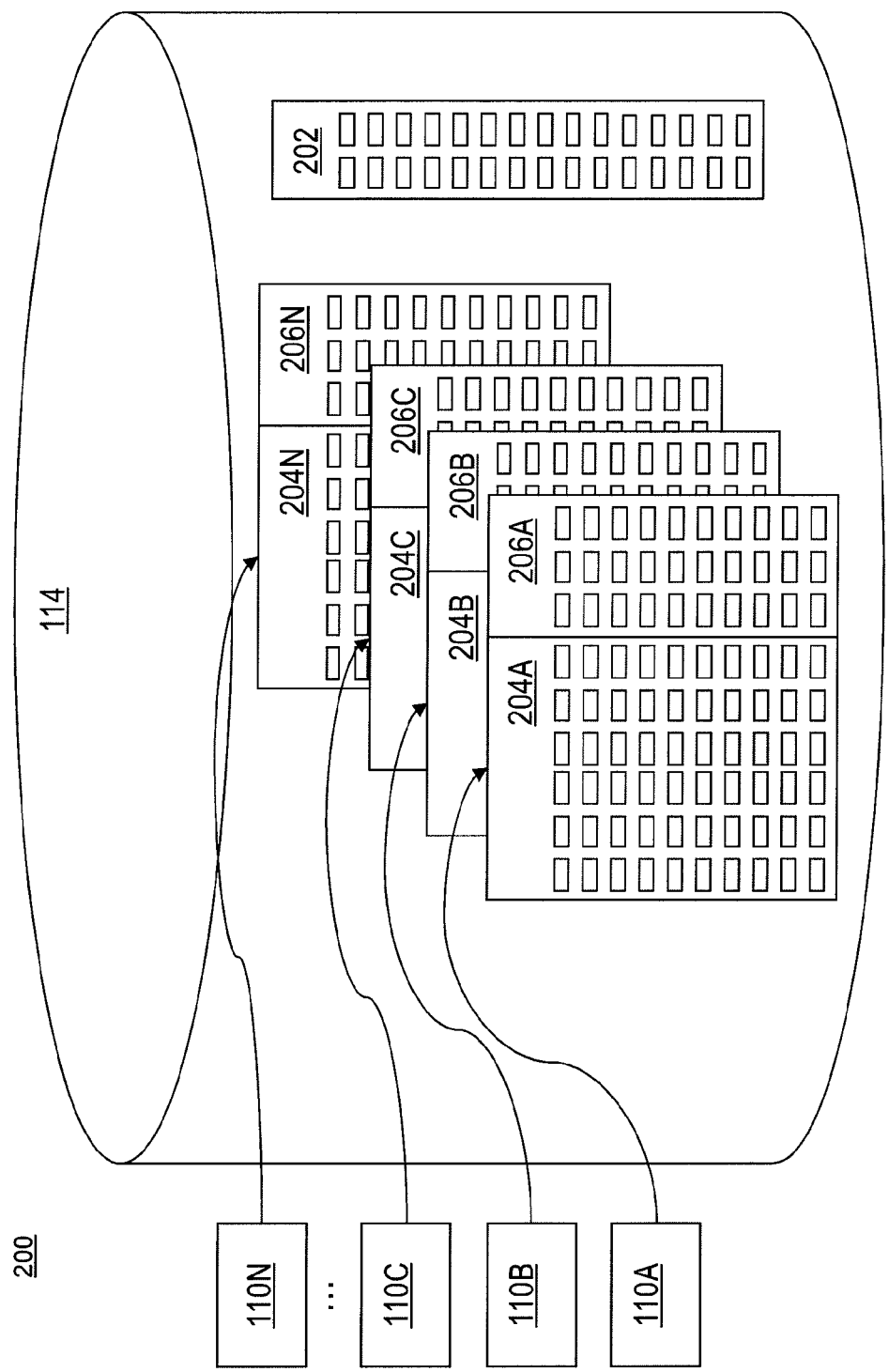
FIG. 2 is a diagram illustrating various types of content stored in the multi-tenant computing system of FIG. 1.

To provide for customization of the core software platform for each of multiple organizations supported by a single software delivery architecture 100, the data and data objects stored in the repository or repositories 114 that are accessed by the application server 102 can include three types of content as shown in FIG. 2: core software platform content 202, system content 204, and customer content 206. Core software platform content 202 includes content that represents core functionality and is not modifiable by a tenant. System content 204 can in some examples be created by the runtime of the core software platform and can include core data objects that are modifiable with data provided by each tenant. For example, if the core software platform is an enterprise resource planning (ERP) system that includes inventory tracking functionality, the system content 204A-204N can include data objects for labeling and quantifying inventory. The data retained in these data objects are tenant-specific, for example, each tenant 110A-110N stores information about its own inventory.

Customer content 206A-206N includes data objects or extensions to other data objects that are customized for one specific tenant 110A-110N to reflect business processes and data that are specific to that specific tenant and are accessible only to authorized users at the corresponding tenant. A combination of the software platform content 202 and system content 204 and customer content 206 of a specific tenant are presented to users from that tenant such that each tenant is provided access to a customized solution having data that is available only to users from that tenant.

Customer content data objects can include a key field (for example an extension field in the case of flexibility changes to a tenant user interface) as well as one or more of business configuration information, master data, or other customer content types. For example, customer content 206 can include content types such as screen layout changes, new reports, and other changes that are tested at a test tenant for use in an active or "productive" tenant of the tenants 110A-110N.

Figure 3:
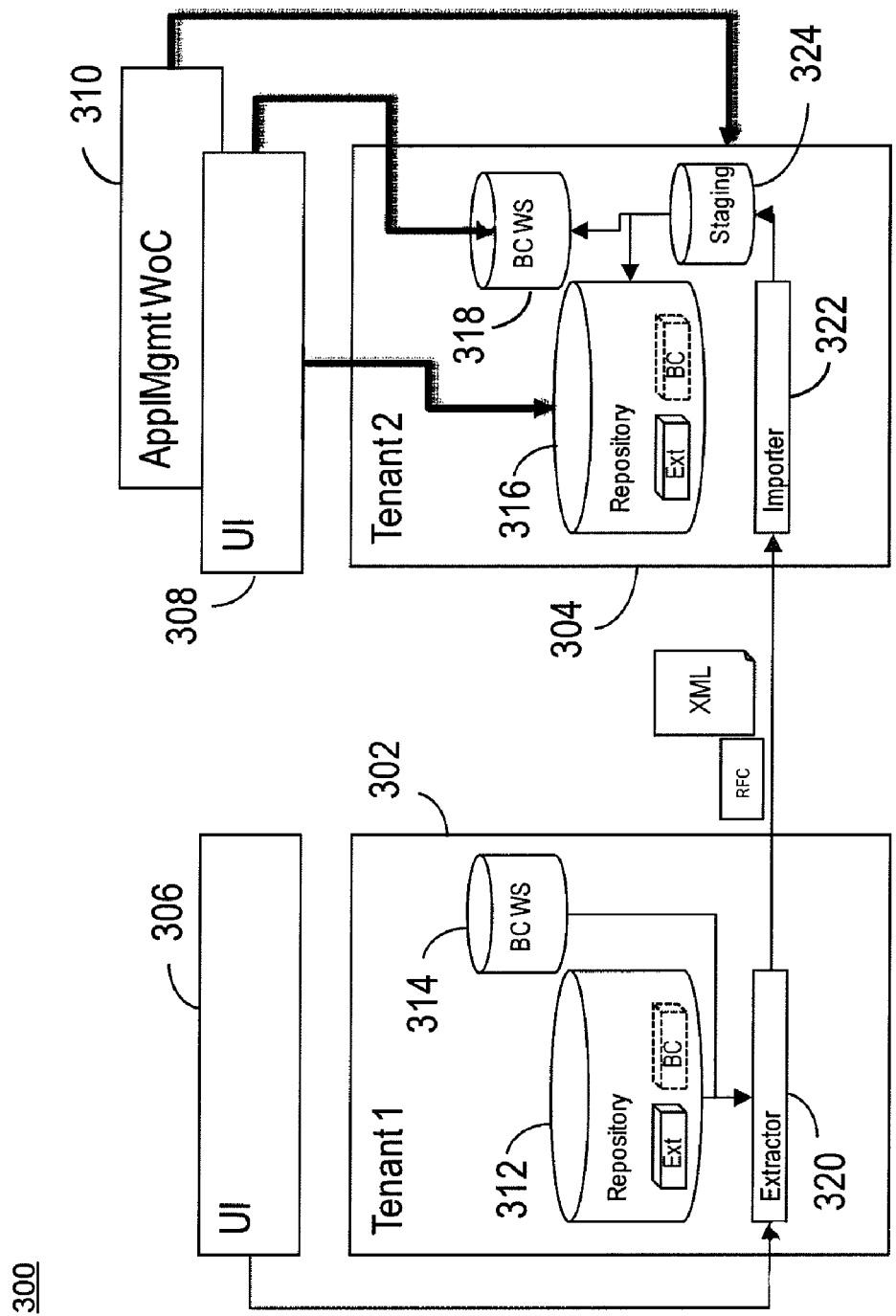
FIG. 3 is a block diagram of a multi-tenant computing system that implements a transport of customer content.

FIG. 3 is a block diagram of a multi-tenant computing system 300 including a system that executes a transport of customer flexibility changes between tenants. The multi-tenant computing system 300 can include two or more tenants, and includes at least a first tenant 302 and a second tenant 304. The first tenant 302 can be used, for example, as a test platform for testing extensions or flexibility changes to core software, applications, business configuration or customer content residing on the tenants of the multi-tenant computing system 300. The second tenant 304 can represent a production tenant, i.e. a computing system to which tested extensions or flexibility changes are transported for activation.

The first tenant 302 can include or is otherwise associated with a user interface 306. The first tenant 302 further includes a repository 312 for storing extensions and business configuration data, and a business configuration workspace 314 as a storage area of workspace data for use by the user interface 306. The user interface 306 accepts inputs from a user to instruct an extractor 320 to extract certain customer content from the repository 312 and/or business configuration workspace 314, of one or more customer content types, for transport to the second tenant 304 according to techniques described below. In some implementations, the customer content is transported from the extractor 320 via remote function call (RFC) as an extensible markup language (XML) document.

The second tenant 304 also includes a repository 316 storing extensions and business configuration data, and a business configuration workspace 318 storing workspace data for an associated user interface 308. The second tenant 304 also includes, or is otherwise associated with an application management workcenter 310. The application management workcenter 310 can be used by the customer to monitor the extraction process from the staging area 324. It can also be used to restart extraction from staging area 324 to the local staging areas in 316 and 318 if the extraction process failed.

To import customer content being extracted from the first tenant 302, the second tenant 304 includes an importer 322 for receiving the customer content, and sending the customer content to a generic staging area 324, where the customer content is temporarily persisted. The repository 316 and/or business configuration workspace 318 can initiate a content extraction trigger to extract selected customer content from the generic staging area 324 into one of several local staging areas (in the repository 316 or business configuration workspace 318, respectively). From the local staging area, the selected customer content can be activated by the user interface 308, while the application management workcenter 310 monitors replication staging, as well as executes a restart in case of error.

Figure 4:
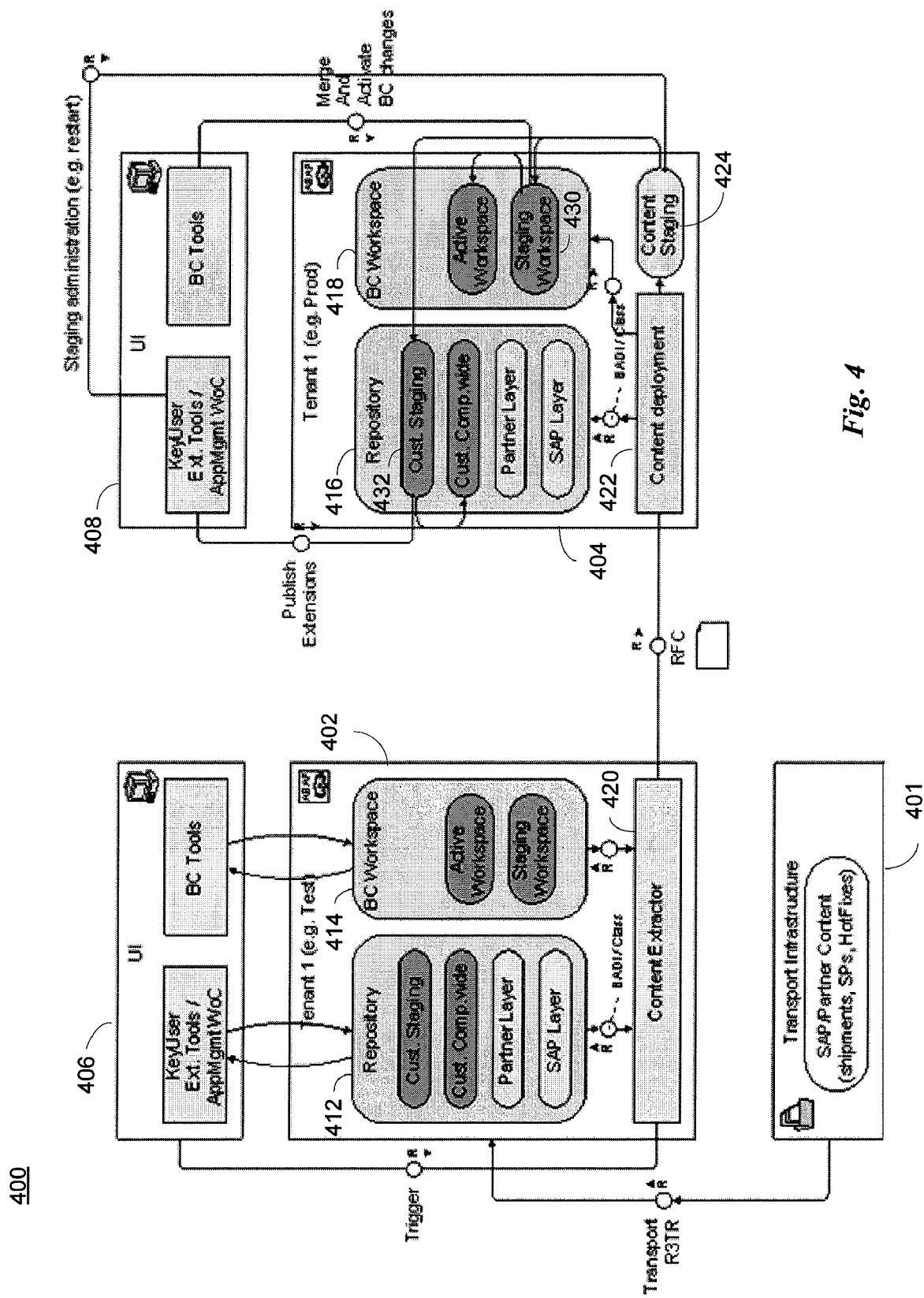
FIG. 4 is a block diagram of a multi-tenant computing system illustrating a particular implementation of transport of customer content from a test tenant to a productive tenant.

FIG. 4 is a block diagram of a multi-tenant computing system 400 illustrating transport of customer flexibility changes between tenants. A first tenant 402 includes a user interface 406. The user interface 406 can include user extension tools and application management tools that communicate with a repository 412, and business configuration tools that communicate with a business configuration workspace 414. The repository 412 can include a core software platform, third party applications that work with the core software platform, customer content and customer staging (i.e. a first local staging area). The business configuration workspace 414 includes active workspace components for display in the user interface 416 as well as a staging workspace (i.e. second local staging area).

A second tenant 404 also includes a user interface 408 that also includes user extension tools and application management tools that communicate with a repository 416, and business configuration tools that communicate with a business configuration workspace 418 in the second tenant 404. The repository 416 can include a core software platform, third party applications that work with the core software platform, customer content and customer staging (i.e. a first local staging area). The business configuration workspace 418 includes active workspace components for display in the user interface 416 as well as a staging workspace (i.e. second local staging area).

In one implementation, the first tenant 402 can be a test tenant for flexibility changes to any content types in the repository 412 and/or business configuration workspace 414, while the second tenant 404 can be a productive tenant to implement tested flexibility changes of the content types in its repository 416 and/or business configuration workspace 418. Delivery of the core software platform and third party applications can be initiated by a transport infrastructure 401, which delivers the data of the core software platform and third party applications in any of a variety of formats, including a software shipment, service pack update, or hot fixes, or by any other transport mechanism. The transport infrastructure 401 is controlled by the hosting provider administrator to execute a software installation and update. By having the infrastructure 401 separated from the infrastructure 420 used to transport the customer flexibility changes, the processes are decoupled. A customer can initiate a flexibility transport without involvement of the hosting provider administrator and interferences between the two processes (software delivery and flexibility transport) are minimized.

Once the flexibility changes to customer content are deployed and tested on the first tenant 402, relevant customer content from the first tenant 402 can be transported to one or more productive tenants, such as the second tenant 404, for activation. To conduct the transport, a content extractor 420 associated with the first tenant 402 exports the relevant customer content, of selected customer content types, from the repository 412 and/or business configuration workspace 414, and serializes the content in an appropriate format. Using a transport mechanism such as an RFC, the content extractor transfers the customer content to a content deployment module 422 that imports the customer content. The content deployment module 422 stores the customer content in a generic content staging area 424, where it is persisted until the business configuration workspace 418 or repository 416 of the second tenant initiates a content extraction trigger to extract and move selected customer content to a staging workspace 430 or a customer staging area 432, respectively, as a local staging area. The extensibility tools of the user interface 408 can then activate the selected customer content from the staging workspace 430 and/or customer staging area 432.

Figure 5:
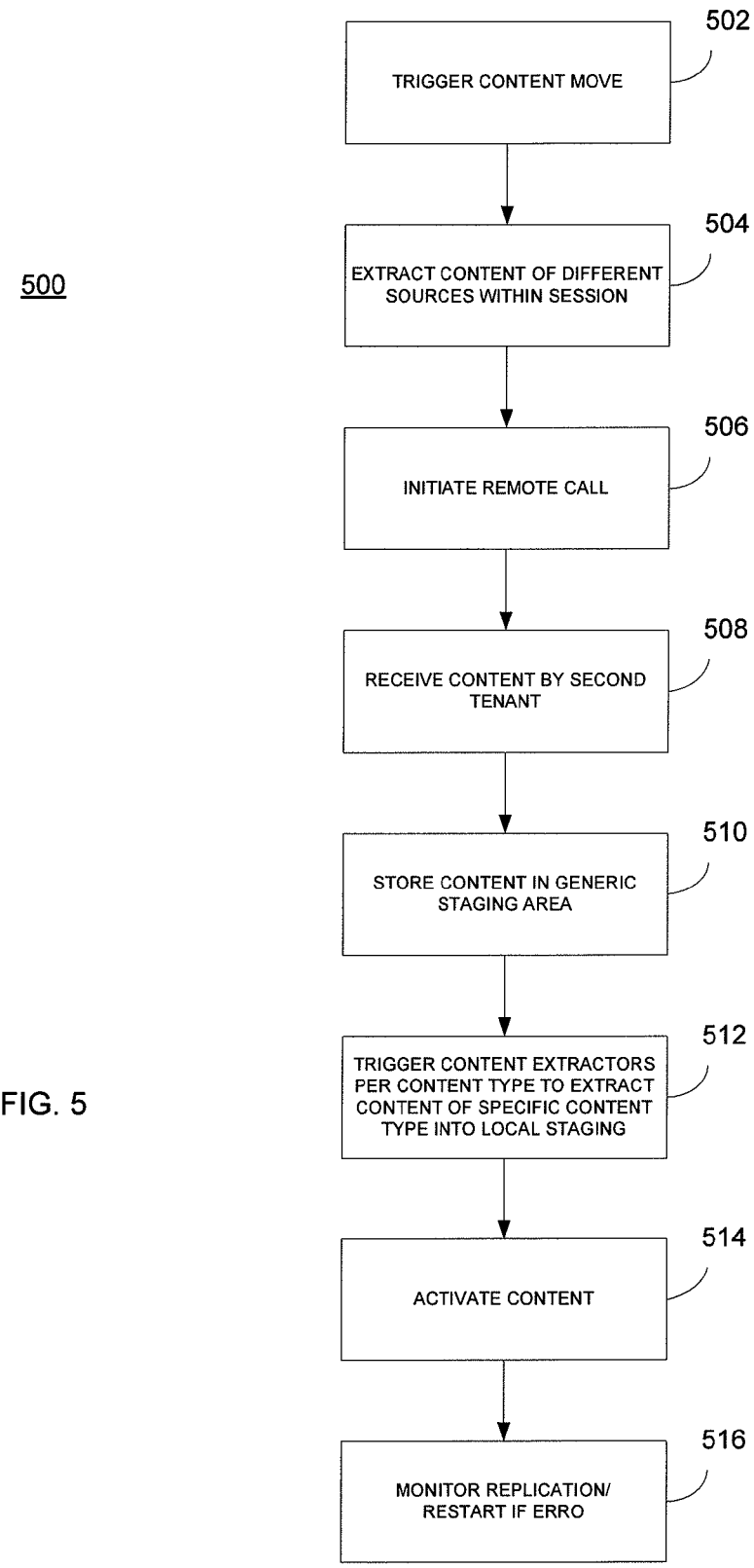
FIG. 5 is a flowchart of a method for transporting customer content between customer tenants in a multi-tenant computing system.

FIG. 5 is a flowchart of a method 500 for transporting customer flexibility changes between tenants in a multi-tenant computing environment. At 502, a trigger is initiated by a first tenant to move customer content in the first tenant to a second tenant. The first tenant can be a test tenant, while the second tenant can be a productive tenant. The trigger can be based on a user input signal, or other signal automatically generated for the second tenant, i.e. upon successful testing of the customer content. At 504 customer content of different sources within a session are extracted. The customer content can be extracted from a repository of the first tenant, where it is stored as business configuration data, master data, flexibility changes, or other content types.

At 506 a remote call to the second tenant is initiated, preferably by an extraction mechanism in the first tenant. At 508, the content is transported from the first tenant to the second tenant, and received by the second tenant, preferably by an importer mechanism in the second tenant. At 510, the imported customer content is stored in a generic staging area, i.e. a staging area that is generic to either a repository of some content types or a business configuration workspace storing other content types.

At 512, content extraction triggers are initiated, i.e. by the repository or the business workspace in the second tenant, for example, to extract customer content of a specific content type from the generic staging area into a local staging area. There can be one or more local staging areas in the second tenant, which can be further based on content type. At 514 content stored in the local staging area(s) are activated according to user input in a user interface of the second tenant. At 516, the activation and replication of the content is monitored for errors, and a restart is executed if errors are present.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
identifying a content move trigger in a multi-tenant computing system, the content move trigger characterizing a transfer of customer content from a first tenant of the multi-tenant computing system to a second tenant of the multi-tenant computing system;
exporting the customer content from the first tenant based on the content move trigger;
transporting the exported customer content from the first tenant to the second tenant;
importing the exported customer content into a staging area in the second tenant to enable a user associated with the second tenant to selectively access the exported customer content via the staging area based on a content extraction trigger, the content extraction trigger characterizing an extraction of selected customer content from the staging area to activate the selected customer content in the second tenant; and
wherein the multi-tenant computing system forms part of a multi-tenant environment using a single software delivery architecture, and includes;
at least one processor implementing an application server accessible over a network from the plurality of clients associated with each of multiple tenants; and
at least one data repository containing:
core software platform content relating to the operation of the multi-tenant computing system which is not modifiable by the multiple tenants;
system content including data objects created in runtime by the multi-tenant computing system that are modifiable with data provided by a corresponding tenant, and
the customer content including data objects or extensions to data objects that are customized for a corresponding tenant.

2. A method as in claim 1, wherein the content extraction trigger is based on a content type.

3. A method as in claim 1, further comprising activating the selected content in the second tenant.

4. A method as in claim 3, further comprising monitoring the activating of the selected content to determine errors in the staging area.

5. A method as in claim 1, wherein the staging area further comprises:
    a generic staging area that persists the selected customer content; and
    a local staging area that extracts the selected customer content from the generic staging area according to a content type associated with the customer content.

6. A method as in claim 5, further comprising activating the selected content from the local staging area in the second tenant.

7. A computer-implemented method for transporting flexibility changes of customer content between tenants in a multi-tenant computing system, the method comprising:
    exporting customer content from a first tenant of the multi-tenant computing system;
    transporting the customer content exported from the first tenant to a second tenant of the multi-tenant computing system;
    importing the customer content into a staging area in the second tenant to enable a user associated with second tenant to access the customer content via the staging area based on a content extraction trigger, the content extraction trigger characterizing an extraction of at least some of the customer content from the staging area; and
    activating selected customer content from the staging area in a productive component of the second tenant.

8. The method in accordance with claim 7, wherein the staging area further comprises:
    a generic staging area that persists the selected customer content; and
    a local staging area that extracts the selected customer content from the generic staging area according to a content type associated with the customer content.

9. The method in accordance with claim 7, further comprising monitoring activation of the selected customer content in the second tenant.

10. The method in accordance with claim 7, wherein the customer content includes business configuration data of a business configuration workspace.

11. The method in accordance with claim 10, wherein the customer content includes change data associated with the business configuration data.

12. A method as in claim 7, wherein the content extraction trigger is based on a content type.

13. A method as in claim 7, further comprising activating the selected content in the second tenant.

14. A computer program product comprising a non-transitory machine-readable medium storing instructions that, when executed by at least one processor, cause the at least one processor to perform operations comprising:
    identifying a content move trigger in a multi-tenant computing system, the content move trigger characterizing a transfer of customer content from a first tenant of the multi-tenant computing system to a second tenant of the multi-tenant computing system;
    exporting the customer content from the first tenant based on the content move trigger;
    transporting the exported customer content from the first tenant to the second tenant;
    importing the exported customer content into a staging area in the second tenant to enable a user associated with the second tenant to selectively access the exported customer content via the staging area based on a content extraction trigger, the content extraction trigger characterizing an extraction of selected customer content from the staging area to activate the selected customer content in the second tenant; and
    wherein the multi-tenant computing system forms part of a multi-tenant environment using a single software delivery architecture, and includes;
        at least one application server accessible over a network from the plurality of clients associated with each of multiple tenants; and
        at least one data repository containing:
            core software platform content relating to the operation of the multi-tenant computing system which is not modifiable by the multiple tenants;
            system content including data objects created in runtime by the multi-tenant computing system that are modifiable with data provided by a corresponding tenant, and
            the customer content including data objects or extensions to data objects that are customized for a corresponding tenant.

15. A computer program product as in claim 14, wherein the content extraction trigger is based on a content type.

16. A computer program product as in claim 14, wherein the operations further comprise activating the selected content in the second tenant.

17. A computer program product as in claim 16, further comprising monitoring the activating of the selected content to determine errors in the staging area.

18. A method as in claim 14, wherein the staging area further comprises:
    a generic staging area that persists the selected customer content; and
    a local staging area that extracts the selected customer content from the generic staging area according to a content type associated with the customer content.

19. A computer program product as in claim 18, wherein the operations further comprise activating the selected content from the local staging area in the second tenant.

20. A computer program product as in claim 14, further comprising the at least one processor that performs the operations.

* * * * *